April 14, 1959   A. C. ATKINSON, SR., ET AL   2,881,555
CROP DUSTER
Filed April 3, 1956   2 Sheets-Sheet 1
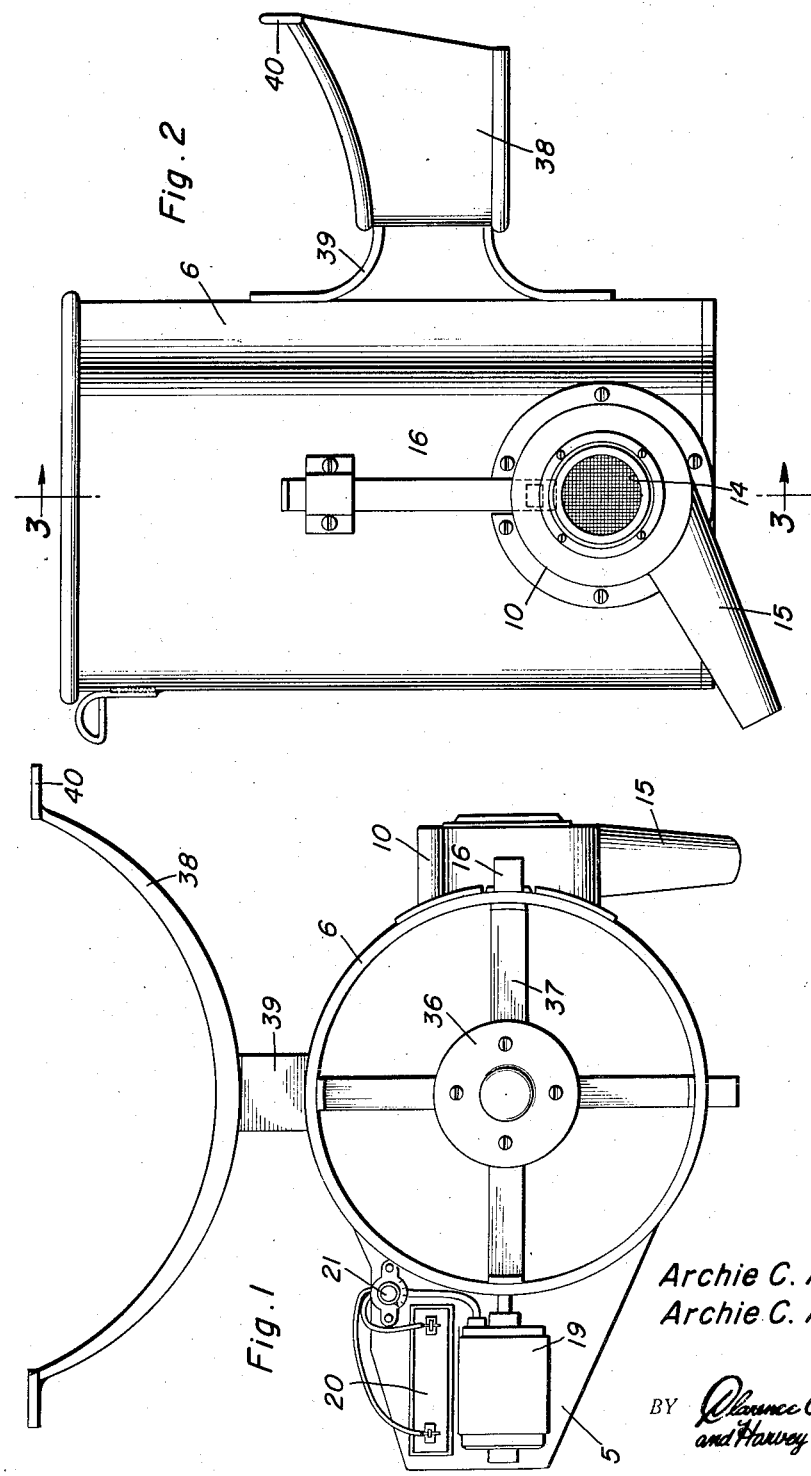
Archie C. Atkinson, Sr.
Archie C. Atkinson, Jr.
INVENTORS.

April 14, 1959  A. C. ATKINSON, SR., ET AL  2,881,555
CROP DUSTER
Filed April 3, 1956  2 Sheets-Sheet 2
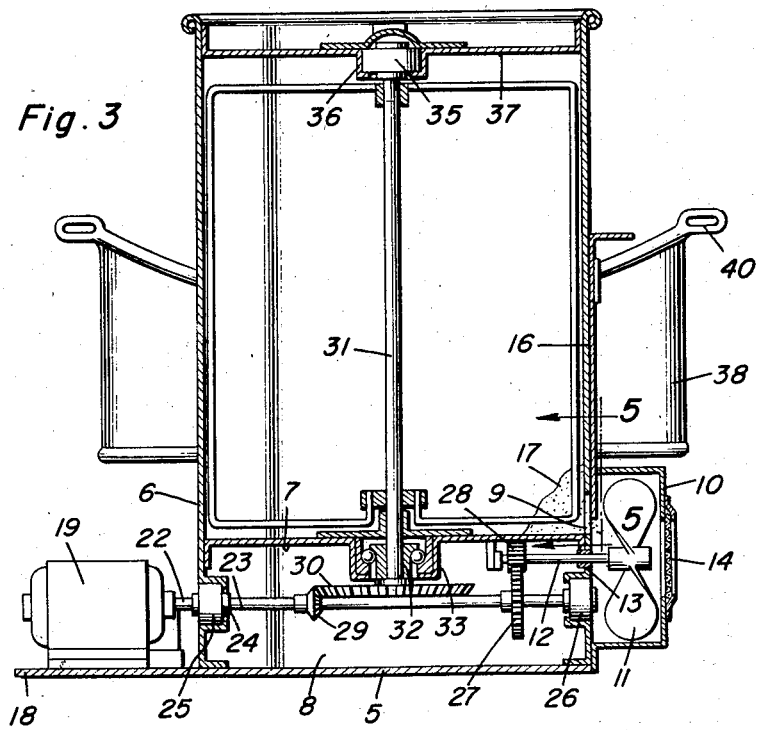
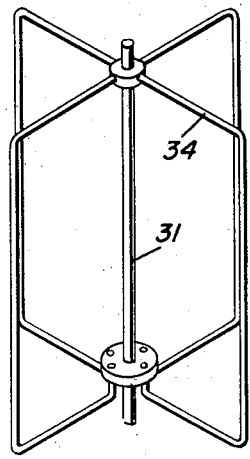
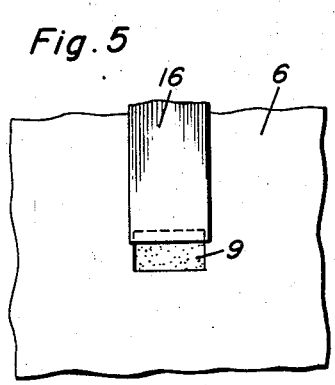
Archie C. Atkinson, Sr.
Archie C. Atkinson, Jr.
INVENTORS.
BY Clarence A. O'Brien
and Harvey B. Jackson
Attorneys

United States Patent Office 2,881,555
Patented Apr. 14, 1959

2,881,555

CROP DUSTER

Archie C. Atkinson, Sr., and Archie C. Atkinson, Jr.,
New Hill, N.C.

Application April 3, 1956, Serial No. 575,875

1 Claim. (Cl. 43—148)

The present invention relates to new and useful improvements in apparatus for distributing or spraying insecticide or the like on growing crops, such as tobacco, cotton, or other plants.

An important object of the invention is to provide a portable crop duster equipped with a self-contained lower plant for operating a blower to spray the plants with poison dust.

Another object of the invention is to provide a crop duster which may be strapped to the body of a person for convenient maneuverability of the apparatus and for discharging the insecticide in a desired direction.

A further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view;

Figure 2 is a side elevational view;

Figure 3 is a vertical sectional view taken on a line 3—3 of Figure 2;

Figure 4 is a perspective view of the agitator; and,

Figure 5 is an enlarged vertical sectional view taken on a line 5—5 of Figure 3.

Referring now to the drawings in detail wherein for the purpose of illustration we have disclosed a preferred embodiment of our invention, the numeral 5 designates a base member or platform on which a hopper 6 of cylindrical shape is supported in an upstanding position. The lower portion of the hopper is provided with a false bottom 7 forming a housing 8 under the hopper.

The lower portion of the hopper 6 is provided with an outlet opening 9 leading to a blower housing 10 in which a fan or blower 11 is rotatably positioned and secured to a shaft 12 which is rotatably mounted in a bushing 13 in the side of the housing 8. The outer surface of the blower housing 10 is provided with a screened air inlet 14 and a tapered spout 15 extends downwardly in an inclined direction from the lower portion of the blower housing 10.

The outlet 9 for the hopper is provided with a vertically slidable valve 16 to regulate flow of powdered insecticide 17 from the hopper into the blower housing 10.

The base member or platform 5 projects laterally outwardly at one side of the hopper 6 to form a shelf 18 on which an electric motor 19 is supported together with a dry cell battery 20 which is electrically connected to the motor for driving the same. The motor is controlled by a rheostat type switch 21 to regulate the speed thereof.

The shaft 22 of the motor 19 is connected to a shaft 23 by means of a shaft coupling 24 and the shaft 23 is journaled in bearings 25 and 26 supported in diametrically opposite sides of the housing 8. The shaft 23 is connected to the shaft 12 for the blower 11 by means of gears 27 and 28.

The shaft 23 is also provided with a bevel gear 29 which is meshed with a bevel gear 30 secured to the lower end of a vertical shaft 31 which is provided with a bearing assembly 32 supported in a housing 33 at the underside of the false bottom 7 for the hopper. The vertical shaft 31 extends upwardly into the hopper 6 and to which an agitator 34 is secured. The upper end of vertical shaft 31 is provided with a bearing 35 journaled in a housing 36 at the central portion of a spider 37 which is removably secured in the upper portion of the hopper.

A semi-circular body attaching member 38 is secured to one side of the hopper 6 by brackets 39 and the member 38 is provided with strap attaching loops 40 adapted for attaching a strap or harness (not shown) thereto for attaching the apparatus to the body of a person.

The spout 15 is inclined in a forward direction with respect to the body attaching member 38 so that the powdered insecticide will be discharged in a forward direction with respect to the person carrying the plant dusting apparatus.

The fan or blower 11 will be driven by the motor 19 to blow the powdered insecticide through the spout 15 for dusting plants or crops by a person carrying the hopper and, at the same time, the agitator 34 is actuated to aid in feeding the insecticide material 17 through the outlet 9 of the hopper.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

In a portable crop duster, a hopper comprising an upstanding cylinder, a platform supporting said cylinder thereon and having a ledge extending outwardly from one side of the cylinder, a false bottom in the cylinder forming with said platform a closed chamber below the false bottom and in the cylinder, an outlet means in the other side of the cylinder above said false bottom for dusting material in the cylinder, a blower housing on said other side of the cylinder for receiving material from the outlet and having a discharge nozzle, a blower fan in said housing having a fan shaft extending through said other side of the cylinder into said chamber, a power shaft extending through said sides of the cylinder and through said chamber and having bearings in said sides of the cylinder, a motor on said ledge operatively connected to the power shaft, an agitator in the cylinder having a shaft depending into said chamber, drive gearing in the chamber between the power and fan shafts, and drive gearing in said chamber between said power and agitator shafts.

References Cited in the file of this patent

UNITED STATES PATENTS

| | | |
|---|---|---|
| 1,394,686 | Redmon | Oct. 25, 1921 |
| 2,740,230 | Clapper | Apr. 3, 1956 |
| 2,795,080 | Williams | June 11, 1957 |